United States Patent
Moffitt et al.

(10) Patent No.: US 10,953,982 B2
(45) Date of Patent: Mar. 23, 2021

(54) ROTORCRAFT INCLUDING AUXILIARY PROPULSOR POSITIONED TO INGEST BOUNDARY LAYER FLOW

(71) Applicant: Sikorsky Aircraft Corporation, Stratford, CT (US)

(72) Inventors: Blake Almy Moffitt, South Windsor, CT (US); Brian E. Wake, South Glastonbury, CT (US); Peter F. Lorber, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 667 days.

(21) Appl. No.: 15/513,886

(22) PCT Filed: Sep. 29, 2015

(86) PCT No.: PCT/US2015/052876
§ 371 (c)(1),
(2) Date: Mar. 23, 2017

(87) PCT Pub. No.: WO2016/053997
PCT Pub. Date: Apr. 7, 2016

(65) Prior Publication Data
US 2017/0297697 A1      Oct. 19, 2017

Related U.S. Application Data

(60) Provisional application No. 62/057,617, filed on Sep. 30, 2014.

(51) Int. Cl.
*B64C 27/82* (2006.01)
*B64C 21/00* (2006.01)
(Continued)

(52) U.S. Cl.
CPC .............. *B64C 27/82* (2013.01); *B64C 11/00* (2013.01); *B64C 21/00* (2013.01); *B64C 27/04* (2013.01);
(Continued)

(58) Field of Classification Search
CPC ......... B64D 27/20; B64C 27/02; B64C 27/22; B64C 27/26; B64C 2027/8236; B64C 27/82
See application file for complete search history.

(56) References Cited

U.S. PATENT DOCUMENTS 2,405,244 A * 8/1946 Stanley .................. B64C 27/02
244/17.21
2,959,373 A    11/1960 Zuck
(Continued)

FOREIGN PATENT DOCUMENTS

| EP | 2719621 A2 | 4/2014 | |
|---|---|---|---|
| FR | 1487502 A * | 7/1967 | ............. A01G 25/00 |
| FR | 2355715 A1 * | 1/1978 | ............. B64C 11/00 |

OTHER PUBLICATIONS

European Search Report for European Application No. 15845805.9; dated Mar. 20, 2018, 8 pages.
(Continued)

*Primary Examiner* — Philip J Bonzell
(74) *Attorney, Agent, or Firm* — Baker Botts L.L.P.

(57) ABSTRACT

A rotorcraft is provided and includes a fuselage. The fuselage includes drag generating portions, a main rotor assembly and an auxiliary propulsor having an expected propulsion efficiency. The auxiliary propulsor is disposed to ingest boundary layer flows and in wake regions associated with the drag generating portions and is provided with a corresponding increase in the expected propulsion efficiency thereof.

12 Claims, 11 Drawing Sheets

(51) Int. Cl.
*B64C 27/10* (2006.01)
*B64C 27/04* (2006.01)
*B64C 11/00* (2006.01)
*B64C 27/32* (2006.01)

(52) U.S. Cl.
CPC .............. *B64C 27/10* (2013.01); *B64C 27/32* (2013.01); *B64C 2027/8236* (2013.01); *B64C 2230/04* (2013.01); *B64C 2230/28* (2013.01); *Y02T 50/10* (2013.01); *Y02T 50/60* (2013.01)

(56) References Cited

U.S. PATENT DOCUMENTS

| | | | |
|---|---|---|---|
| 3,008,671 A | 11/1961 | Schneiter | |
| 3,013,749 A * | 12/1961 | Dunham | B64C 27/26 244/17.11 |
| 3,241,791 A * | 3/1966 | Piasecki | B64C 27/82 244/17.19 |
| 3,902,688 A | 9/1975 | Seibel et al. | |
| 4,010,919 A * | 3/1977 | Breuner | B64C 27/02 244/17.21 |
| 4,533,101 A | 8/1985 | Patterson, Jr. | |
| 4,726,547 A * | 2/1988 | Zimmer | B64C 27/325 244/17.11 |
| 4,795,308 A | 1/1989 | Fischer et al. | |
| 4,928,907 A * | 5/1990 | Zuck | B64C 27/26 244/48 |
| 5,100,085 A | 3/1992 | Rubbert | |
| 5,135,185 A | 8/1992 | Adamson et al. | |
| 5,150,859 A | 9/1992 | Ransick | |
| 5,437,419 A * | 8/1995 | Schmitz | B64C 9/32 244/1 N |
| 5,702,071 A | 12/1997 | Kroll et al. | |
| 5,738,301 A | 4/1998 | Francois et al. | |
| 6,082,670 A | 7/2000 | Chapman | |
| 6,089,501 A * | 7/2000 | Frost | B64C 27/021 244/17.11 |
| 7,448,571 B1 * | 11/2008 | Carter, Jr. | B64C 27/02 244/17.11 |
| 7,530,787 B2 * | 5/2009 | Bertolotti | B64C 1/00 416/124 |
| 7,967,239 B2 | 6/2011 | Cotton et al. | |
| 8,210,798 B2 | 7/2012 | Stern | |
| 8,286,909 B2 | 10/2012 | Lee | |
| 9,902,492 B1 * | 2/2018 | Sonneborn | B64C 27/26 |
| 10,435,163 B2 * | 10/2019 | Gallet | F02C 6/02 |
| 2003/0168552 A1 | 9/2003 | Brown | |
| 2005/0045762 A1 * | 3/2005 | Pham | B64C 27/26 244/7 R |
| 2009/0127384 A1 | 5/2009 | Voorhees | |
| 2009/0159740 A1 * | 6/2009 | Brody | B64C 27/10 244/17.21 |
| 2012/0104156 A1 | 5/2012 | Groen | |
| 2012/0107130 A1 | 5/2012 | Lin | |
| 2014/0030103 A1 | 1/2014 | Matalanis et al. | |
| 2015/0291285 A1 * | 10/2015 | Gallet | F01D 13/02 415/60 |
| 2016/0122005 A1 * | 5/2016 | Florea | B64C 21/04 244/53 B |

OTHER PUBLICATIONS

ISR/WO, Issued Jan. 12, 2016, U330284PCT, PCT Application No. PCT/US15/52876, 15 pages.

* cited by examiner

ROTORCRAFT INCLUDING AUXILIARY PROPULSOR POSITIONED TO INGEST BOUNDARY LAYER FLOW

This application claims the benefit of PCT Application No. PCT/US15/52876, filed on Sep. 29, 2015, which in turn claims priority to U.S. provisional patent application Ser. No. 62/057,617, filed Sep. 30, 2014. The entire contents of PCT Application No. PCT/US15/52876 and U.S. provisional patent application Ser. No. 62/057,617 are incorporated herein by reference.

BACKGROUND OF THE INVENTION

The subject matter disclosed herein relates to a rotorcraft configuration and a method of rotorcraft design.

A rotorcraft may be configured for high-speed flight and normally includes a fuselage with a cabin defining main section, an upper pylon section disposed at an upper portion of the main section and a tail section disposed at an aft section of the main section. A main rotor assembly is operably disposed at the upper pylon section to provide lift for the rotorcraft and an auxiliary propulsor including a fan or propeller is used to provide the rotorcraft with horizontal thrust.

BRIEF DESCRIPTION OF THE INVENTION

According to one aspect of the invention, a rotorcraft is provided and includes a fuselage. The fuselage includes drag generating portions, a main rotor assembly and an auxiliary propulsor having expected propulsion efficiency. The auxiliary propulsor is disposed to ingest boundary layer flows and in wake regions associated with the drag generating portions and is provided with a corresponding increase in the expected propulsion efficiency thereof.

In accordance with additional or alternative embodiments, the main rotor assembly includes coaxial, counter-rotating main rotors.

In accordance with additional or alternative embodiments, the drag generating portions include a main rotor pylon at an upper portion of the fuselage.

In accordance with additional or alternative embodiments, the drag generating portions further include aerodynamic features disposed on sides of the fuselage.

In accordance with additional or alternative embodiments, the auxiliary propulsor is disposed aft of a rotor disk defined by the main rotor assembly.

In accordance with additional or alternative embodiments, the auxiliary propulsor is disposed to intersect with a rotor of the main rotor assembly and respective rotations of the auxiliary propulsor and the rotor are timed to avoid mutual collisions.

In accordance with additional or alternative embodiments, the auxiliary propulsor is disposed such that an expected increase in an efficiency benefit cancelling pressure drag increase associated with the auxiliary propulsor is reduced.

In accordance with additional or alternative embodiments, the rotorcraft further includes additional drag generating portions and additional auxiliary propulsors having respective expected propulsion efficiencies disposed on the fuselage. The additional auxiliary propulsors are disposed in additional wake regions associated with the additional drag generating portions and are provided with corresponding increases in the respective expected propulsion efficiencies thereof.

In accordance with additional or alternative embodiments, the additional drag generating portions include at least one or more of landing gear elements, skids and removable payloads.

In accordance with additional or alternative embodiments, the additional auxiliary propulsors include ducted rotors.

According to yet another aspect of the invention, a method of designing a rotorcraft is provided and includes assembling a fuselage including drag generating portions, a main rotor assembly and an auxiliary propulsor, identifying wake regions associated with the drag generating portions and positioning the auxiliary propulsor to ingest boundary layer flows and in the wake regions to provide an increase in an expected propulsion efficiency of the auxiliary propulsor.

In accordance with additional or alternative embodiments, the positioning includes positioning the auxiliary propulsor aft of a rotor disk defined by the main rotor assembly.

In accordance with additional or alternative embodiments, the positioning includes positioning the auxiliary propulsor to intersect with a rotor of the main rotor assembly and timing respective rotations of the auxiliary propulsor and the rotor to avoid mutual collisions.

In accordance with additional or alternative embodiments, the positioning includes identifying that an initial design position of the auxiliary propulsor will lead to an expected increase in an efficiency benefit cancelling pressure drag increase and re-positioning the auxiliary propulsor increasingly aft of the initial design position until the expected increase in the efficiency benefit cancelling pressure drag increase is reduced.

In accordance with additional or alternative embodiments, the method further includes assembling additional drag generating portions and additional auxiliary propulsors onto the fuselage, identifying additional wake regions associated with the additional drag generating portions and positioning the additional auxiliary propulsors in the additional wake regions to provide an increase in respective expected propulsion efficiencies of the additional auxiliary propulsors.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
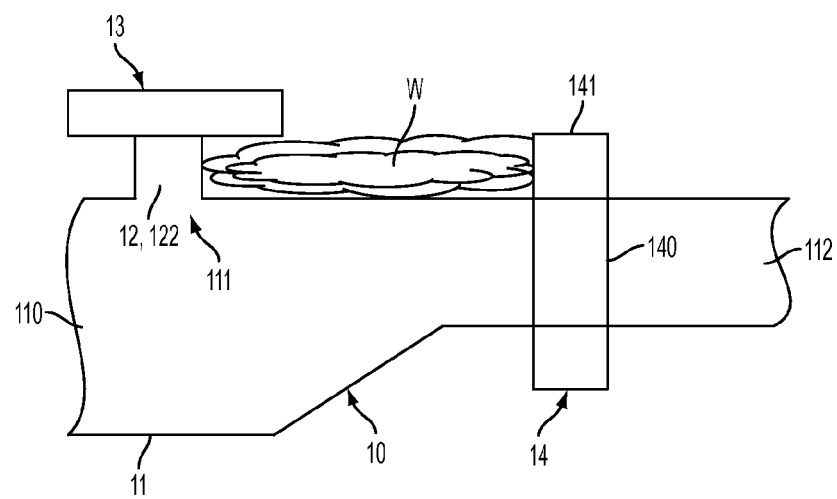
FIG. 1 is a side schematic view of a portion of a rotorcraft in accordance with embodiments.

The detailed description explains embodiments of the invention, together with advantages and features, by way of example with reference to the drawings.

DETAILED DESCRIPTION OF THE INVENTION

Propulsion offered by a boundary layer auxiliary propulsor of a rotorcraft or an aircraft (hereinafter referred to as an "auxiliary propulsor") allows the rotorcraft to reach speeds beyond those available for conventional rotorcraft. However, the auxiliary propulsor(s) or pusher-propellers can require up to about 90-95% of the total power required for flight of given rotorcraft. Consequently, any gain in propulsive efficiency for an auxiliary propulsor can have a substantial effect on overall aircraft performance in terms of range, endurance, maximum speed, etc. While most high-speed rotorcraft place the auxiliary propulsor on pylons or wings to thus operate in undisturbed airflow, the following description relates to a design in which the auxiliary propulsor is disposed to ingest a large amount of wake.

In disposing the auxiliary propulsor to ingest boundary layer flows and a large amount of wake, the auxiliary propulsor will therefore have lower velocity incoming air due to the ingestion of the wake air, which will allow the auxiliary propulsor to produce thrust more efficiently. However, since the auxiliary propulsor can induce high pressure drag forces on upstream surfaces creating the wake, the following description relates to embodiments in which significant wake is created to flow into the auxiliary propulsor with a relatively small amount of pressure drag created upstream of the auxiliary propulsor.

Thus, as will be explained, a high-speed rotorcraft is provided that has a near-axisymmetric shaped fuselage and an auxiliary propulsor disposed in the wake of the fuselage to ingest both boundary layer flows and wake air to allow for significant improvements in pusher-propeller efficiencies. Although the auxiliary propulsor will contribute to slightly increased fuselage drag, this will mainly be limited to an aft end of the fuselage and will only constitute a small overall increase in drag. That is, auxiliary propulsor efficiency gains will far outweigh the increase in drag and result in a net efficiency increase.

With reference to FIGS. 1-3, 16 and 17, a rotorcraft 10 is provided and may be configured as a high-speed rotorcraft, helicopter or manned or unmanned vehicle. The rotorcraft 10 includes a near-axisymmetric fuselage 11 that is formed to define a cabin, which is sized to accommodate a pilot and possibly one or more passengers and/or crewmen, an engine and transmission system that is configured to drive movement of the rotorcraft 10 as well as a flight computer configured to control various operations of the rotorcraft 10 in accordance with current conditions, mission requirements and pilot inputs. The fuselage 11 has a main section 110, an upper pylon section 111 disposed at an upper portion of the main section 110 and a tail section 112 disposed at an aft section of the main section 110.

Figure 16:
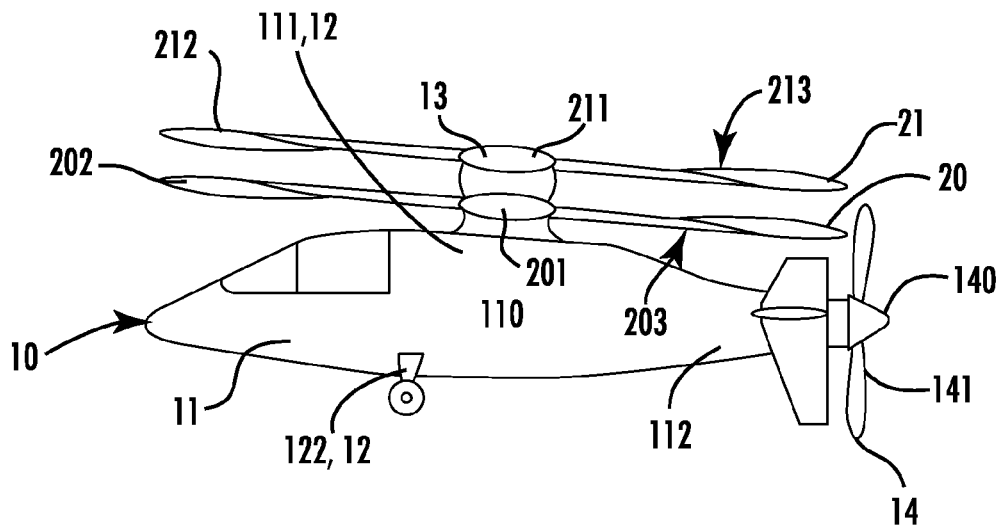
FIG. 16 is a side view of a rotorcraft in accordance with embodiments.
Figure 17:
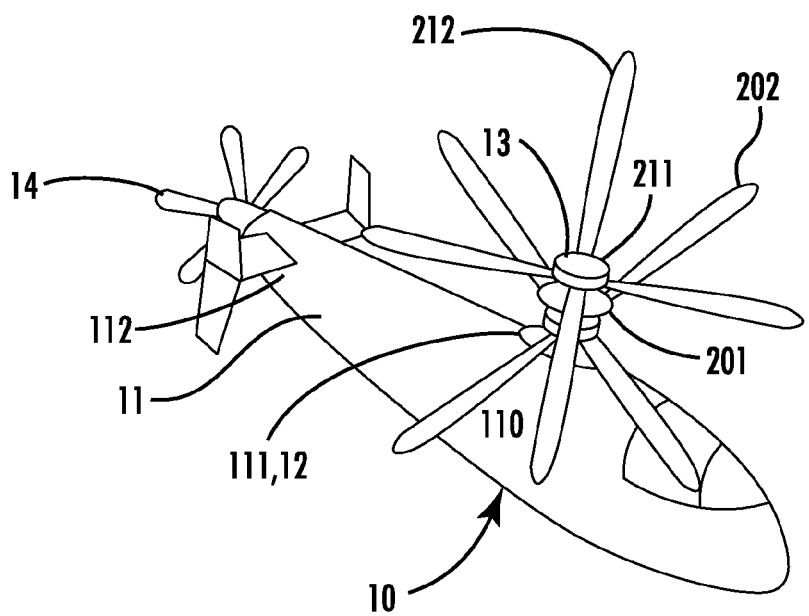
FIG. 17 is a perspective view of the rotorcraft of FIG. 16.

The fuselage 11 further includes a plurality of drag generating portions 12, such as for example the upper pylon section 111 and aerodynamic features 122 disposed on sides of the fuselage 11, a main rotor assembly 13 and an auxiliary propulsor 14. The main rotor assembly 13 is disposed at the upper pylon section 111 and, in accordance with embodiments as shown in FIGS. 2 and 3 and in FIGS. 16 and 17, may be provided with a coaxial, counter-rotating rotor configuration including a lower rotor 20 and an upper rotor 21 (FIGS. 16 and 17 illustrate an embodiment in which a single auxiliary propulsor 14 is provided and FIGS. 2 and 3 illustrate a similar embodiment with additional auxiliary propulsors 40, which will be described below).

Although FIGS. 2 and 3 and FIGS. 16 and 17 relate to a main rotor assembly 13 that is provided with a coaxial, counter-rotating rotor configuration, it will be understood that the description provided herein relates to other types of main rotor assemblies, such as those with single or coaxial main rotors, as well.

The main rotor assembly may include a set of coaxial rotor shafts that extend through the upper pylon section 111 and that are respectively coupled to the engine and transmission system. The lower rotor 20 has a hub 201, which is coupled to one of the rotor shafts, and rotor blades 202 extending outwardly from the hub 201. The upper rotor 21 has a hub 211, which is coupled to the other of the rotor shafts, and rotor blades 212 extending outwardly from the hub 211. Each rotor shaft can be driven in opposite rotational directions by the engine and transmission system to cause the lower rotor 20 and the upper rotor 21 to rotate in first and second opposite directions about the upper pylon section 111. Such rotation defines rotor disks 203, 213 and provides for lift of the rotorcraft 10.

Figure 2:
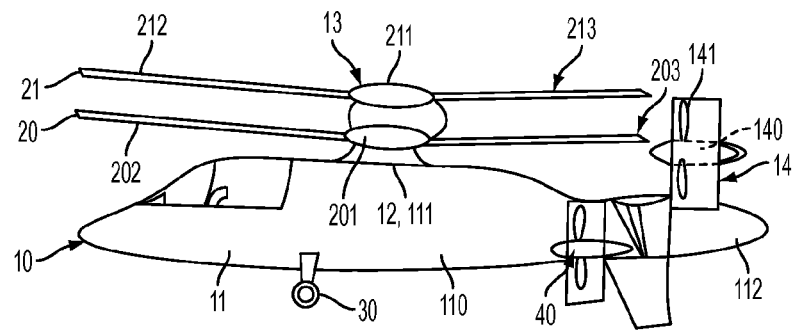
FIG. 2 is a side view of a rotorcraft in accordance with embodiments.
Figure 3:
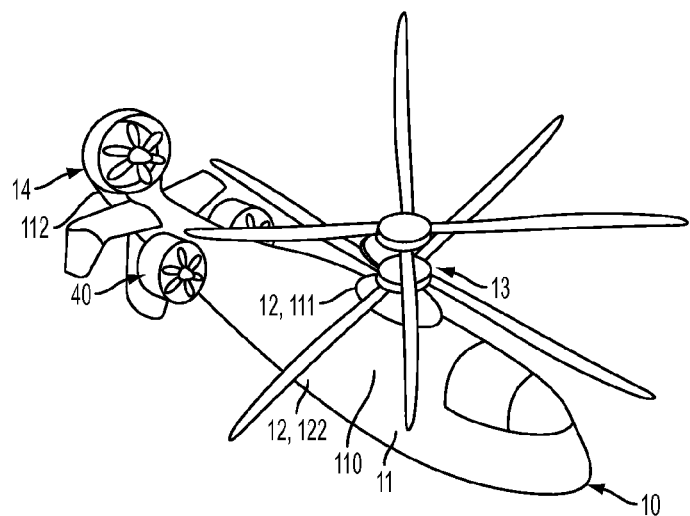
FIG. 3 is a perspective view of the rotorcraft of FIG. 1 in accordance with embodiments.

The auxiliary propulsor 14 may be provided to be coaxial with the tail section 112 (see FIGS. 16 and 17) or offset from the tail section as an additional auxiliary propulsor 40 (see FIGS. 2 and 3). In any case, the auxiliary propulsor 14 (or the additional auxiliary propulsor 40) may be provided as a drag-ingesting propeller and has expected propulsion efficiencies. The auxiliary propulsor 14 is generally disposed at a position defined along the tail section 112 and includes a hub 140 and propeller blades 141 extending outwardly from the hub 140. In this general position, the auxiliary propulsor 14 can be rotated by the engine and transmission system such that the propeller blades 141 rotate about the hub 140 to generate propulsive thrust for the rotorcraft 10. In accordance with various embodiments of the invention, the auxiliary propulsor 14 is disposed such that the propeller blades 141 are disposable to ingest axisymmetric or near-axisymmetric boundary layer flows proceeding along a skin of the rotorcraft 10, the propeller blades 141 are also disposable within and rotatable through axisymmetric or non-axisymmetric wake regions W that are respectively associated with the drag generating portions 12 of the fuselage 11 and such that the auxiliary propulsor 14 is provided with a corresponding increase in the expected propulsion efficiency thereof.

Figure 4:
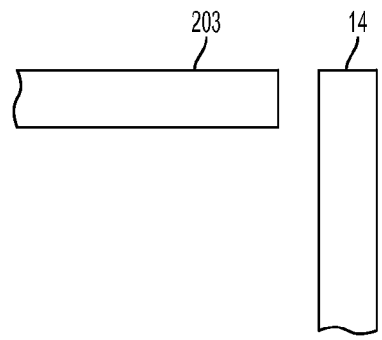
FIG. 4 is a side view of portions of a main rotor assembly and an auxiliary propulsor in accordance with embodiments.
Figure 5:
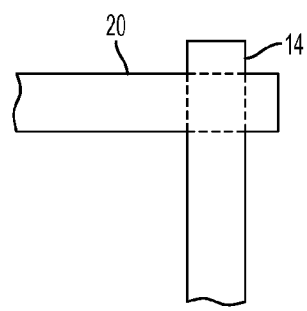
FIG. 5 is a side view of portions of a main rotor assembly and an auxiliary propulsor in accordance with alternative embodiments.

In accordance with various embodiments and, as shown in FIG. 4, the auxiliary propulsor 14 may be disposed at any axial position of the rotorcraft 10 from, e.g., the upper pylon section 111 to a distal end of the tail section 112. More particularly, the auxiliary propulsor 14 may be disposed aft of one or both of the rotor disks 203, 213 of the main rotor assembly 13. Alternatively, as shown in FIG. 5, the auxiliary propulsor 14 may be disposed to intersect with one of the rotor disks (i.e., rotor disk 203) with respective rotations of the auxiliary propulsor 14 and the lower rotor 20 timed to avoid mutual blade collisions.

Figure 6:
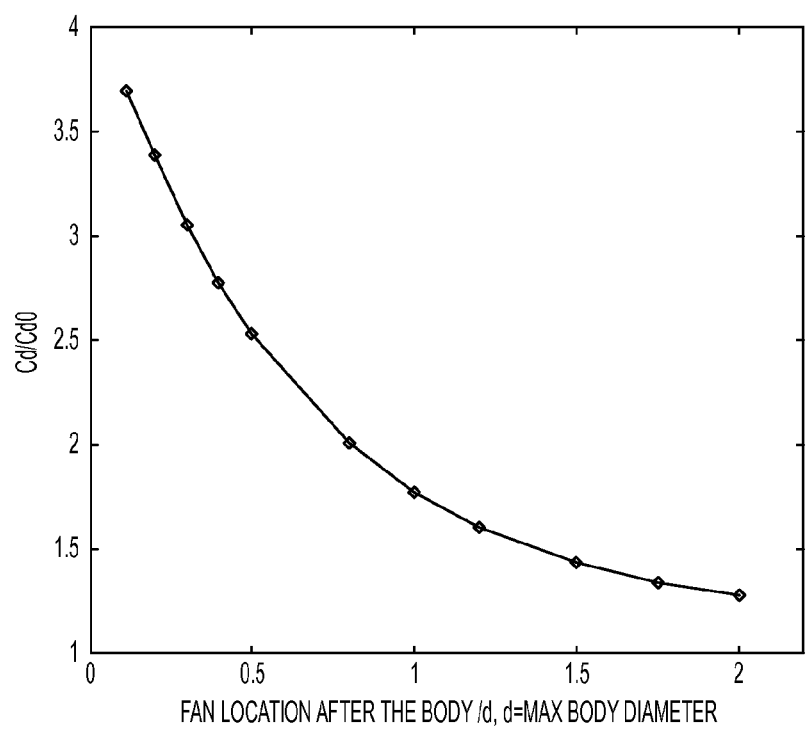
FIG. 6 is a graphical depiction of drag increase as a function of auxiliary propulsor location downstream of drag source.

In accordance with further alternative embodiments, it is understood that the auxiliary propulsor 14 may be associated with and/or may cause a pressure drag increase that cancels out certain efficiency benefits the auxiliary propulsor 14 provides. With this in mind, the auxiliary propulsor 14 may be disposed at an axial position that is defined along a longitudinal length of the rotorcraft 10 such that an expected increase in pressure drag that is associated with or due to the auxiliary propulsor 14 is reduced. That is, with reference to FIG. 6, the auxiliary propulsor 14 will be expected to exert a pressure drag increase that could cancel out any efficiency benefits discussed herein. This pressure drag increase becomes increasingly large with increasingly forward disposition of the auxiliary propulsor 14 with respect to the drag generating portions 12, as shown in FIG. 6. Thus, the auxiliary propulsor 14 may be located in the wake regions of major drag sources (i.e., the drag generating portions 12) to thereby provide for increases in propulsion efficiency of the auxiliary propulsor 14, but still may be disposed far enough downstream from those drag generating portions 12 to avoid excessive pressure drag increases, which can cancel out any efficiency benefits.

With reference back to FIGS. 2 and 3, the rotorcraft 10 may further include additional drag generating portions 30, such as landing gear elements, skids and/or removable payloads and additional auxiliary propulsors 40. As above, the additional auxiliary propulsors 40 may be provided as ducted or un-ducted rotors and have respective expected propulsion efficiencies. The additional drag generating portions 30 may be disposed on sides or lower portions of the fuselage 11 and the additional auxiliary propulsors 40 may also be disposed on the fuselage 11 in the tail section 112, generally. More specifically, the additional auxiliary propulsors 40 may be disposed in additional wake regions that are respectively associated with the additional drag generating portions 30 and thus may be provided with corresponding increases in their respective expected propulsion efficiencies.

Figure 7:
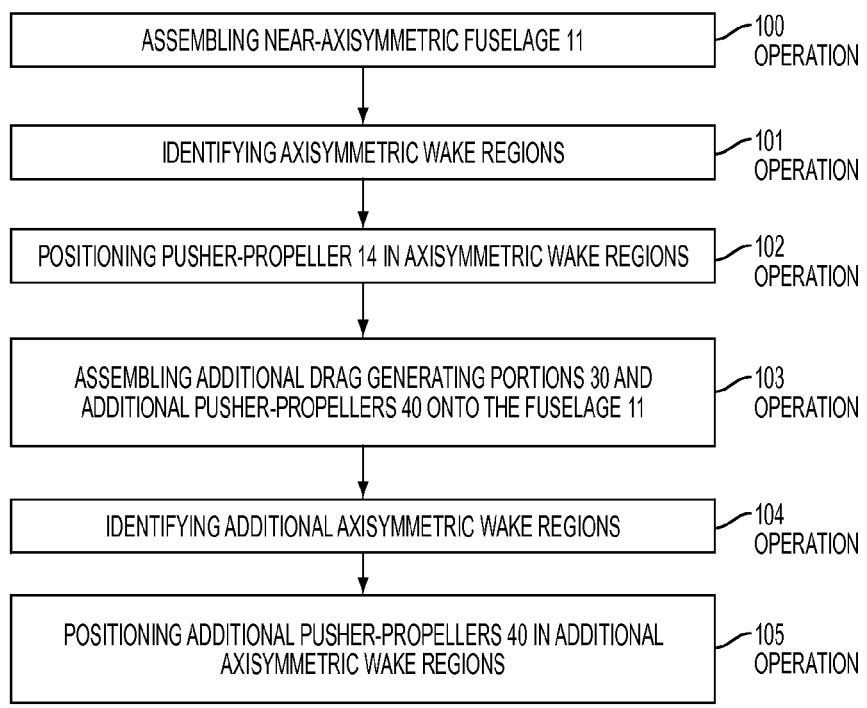
FIG. 7 is a flow diagram illustrating a method of rotorcraft design in accordance with embodiments.

With reference to FIG. 7, a method of designing a rotorcraft is provided and includes assembling a near-axisymmetric fuselage 11 including drag generating portions 12, a main rotor assembly 13 and an auxiliary propulsor 14 (operation 100), identifying wake regions associated with the drag generating portions 12 (operation 101) and positioning the auxiliary propulsor 14 in the wake regions to provide an increase in an expected propulsion efficiency of the auxiliary propulsor 14 (operation 102).

The positioning of operation 102 may include positioning the auxiliary propulsor 14 aft of rotor disks 203, 213 or positioning the auxiliary propulsor 14 to intersect with rotor disk 203 and timing respective rotations of the auxiliary propulsor 14 and the lower rotor 20 to avoid mutual collisions. The positioning of operation 102 may also include identifying that an initial design position of the auxiliary propulsor 14 will lead to an expected increase in an efficiency benefit cancelling pressure drag increase and re-positioning the auxiliary propulsor 14 increasingly aft of the initial design position until the expected increase in the efficiency benefit cancelling pressure drag increase is reduced.

The method may also include assembling additional drag generating portions 30 and additional auxiliary propulsors 40 onto the fuselage 11 (operation 103), identifying additional wake regions associated with the additional drag generating portions 30 (operation 104) and positioning the additional auxiliary propulsors 40 in the additional wake regions to provide an increase in respective expected propulsion efficiencies of the additional auxiliary propulsors 40 (operation 105). The method may also include positioning the auxiliary propulsor 14 to ingest as much viscous producing drag as possible. That is, since there do not tend to be significant drag penalties induced by the auxiliary propulsor 14 on viscous drag sources, repositioning the auxiliary propulsor 14 to result in efficiency gains can be done without concern for excessive increases in induced pressure drag relative to those viscous drag sources. Finally, the method may include designing and re-designing one or more of the blades of the auxiliary propulsor 14 and/or the additional auxiliary propulsors 40. Here, such design and re-design is influenced by the identification of the wake and the additional wake regions and by the axial placement of the auxiliary propulsor 14 and the additional auxiliary propulsors 40.

Figure 8:
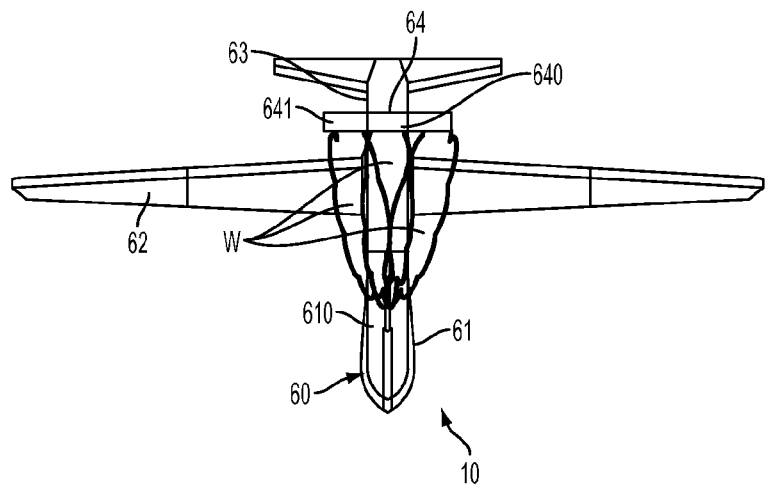
FIG. 8 is a perspective view of an aerial vehicle in accordance with embodiments of the invention.
Figure 9:
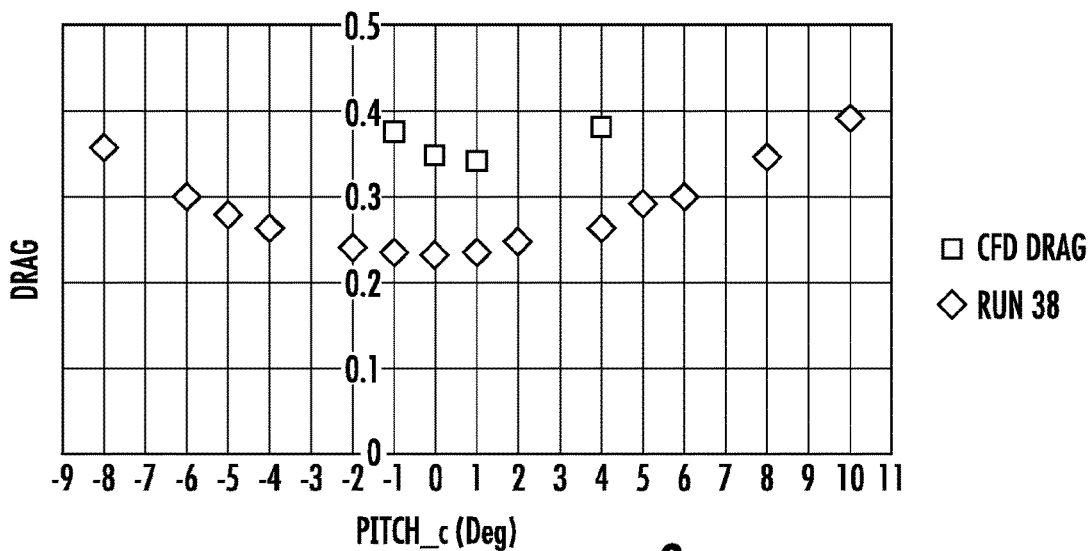
FIG. 9 is a graphical depiction of drag vs. pitch data.
Figure 10:
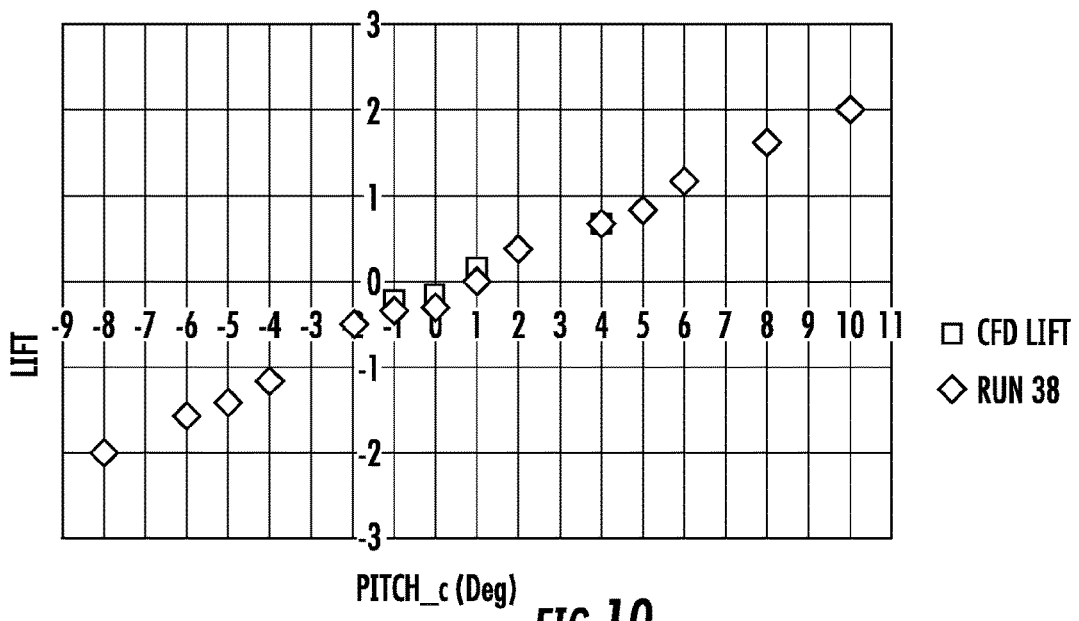
FIG. 10 is a graphical depiction of lift vs. pitch data.

Although the rotorcraft 10 has been described above using a helicopter with coaxial, counter-rotating main rotor blades as an example, it is to be understood that the rotorcraft 10 may be provided as other types of aerial or ground-based vehicles. As an example, with reference to FIG. 8, the rotorcraft 10 may be provided as a manned or unmanned aerial vehicle (UAV) 60. As shown in FIG. 7, the UAV 60 has a fuselage 61 with an extended upper bulge 610, wings 62 extending in opposite directions from the fuselage 61, a tail section 63 at a rear portion of the fuselage 61 and a ducted or un-ducted auxiliary propulsor 64. The fuselage 61 is formed to house various computing elements configured for controlling flight and navigation, sensing elements that may be disposed in the upper bulge 610 as well as transmission/reception elements for communicating with other aerial or ground based vehicles or personnel.

As above, the auxiliary propulsor 64 is disposed in or near the rear portion of the fuselage 61 as a drag-ingesting propeller and has an expected propulsion efficiency. The auxiliary propulsor 64 includes a hub 640 and propeller blades 641 extending outwardly from the hub 640. The auxiliary propulsor 64 can be rotated such that the propeller blades 641 rotate about the hub 640 to generate thrust. In accordance with various embodiments of the invention, the auxiliary propulsor 64 is disposed such that the propeller blades 641 are disposable within and rotatable through axisymmetric or non-axisymmetric wake regions W that are respectively associated with, for example, the upper bulge 610 and the wings 62 and such that the auxiliary propulsor 64 is provided with a corresponding increase in the expected propulsion efficiency thereof.

The configurations described above may have an efficiency gain for a given rotorcraft 10 of about 7-11% over conventional configurations and will be even larger in comparison to cases in which auxiliary propulsors are disposed in front portions of aircraft.

In accordance with further aspects of the invention, multiple studies have focused on improving rotorcraft performance by using active and passive flow control to reduce integrated drag of the fuselage and rotor hub. For all rotorcraft, the rotor-hub is a contributor to overall aircraft drag, and its contribution can be even higher for coaxial-rotor configurations due to the presence of two hubs and an upper shaft. Thus, numerous methods of drag reduction have been identified for rotor hub-drag reduction and, while significant reductions have been achieved with hub fairings, further improvements in overall drag reductions would provide increased aircraft efficiency with the understanding that potential drag-reduction methods vary in degree of complexity and technical maturity and can be applied to various rotorcraft configurations (i.e., coaxial, counter-rotating configurations and single rotor configurations).

Analysis software selected for the modeling efforts for evaluating the potential drag-reduction methods is Star-CCM+, a commercially available, unstructured computational fluid dynamics (CFD) code and baseline CFD models were oriented at zero degrees in pitch and yaw. Adequate distance was provided between the fuselage and inflow and outflow boundaries. Boundary conditions consistent with standard wind-tunnel test conditions of various rotorcraft types were implemented. A slip boundary condition was used for the wind-tunnel walls. A polyhedral mesh was used with an adequately fine prism layer for appropriate near-wall modeling. An implicit, unsteady RANS solver was used with a turbulence model. The wind tunnel is a low-speed (90 kts) 4×6 ft wind-tunnel used for model-scale testing and typical CFD was performed at PWT conditions (low Reynolds and Mach numbers) for validation, and exercised at full-scale flight conditions.

As seen in FIGS. 9 and 10 and FIGS. 15A-15D, the lift and drag forces for the model oriented at different pitch angles was compared to test data previously collected in the wind tunnel. While the drag is over-predicted, the lift force agrees well with test data. A non-zero side force can also be visualized by examining surface streamlines to indicate regions of separation and asymmetry in the flow field.

Since drag was over-predicted due to the auxiliary propulsor 14 described above being found to have less drag than expected, further investigation into different modeling sensitivities was conducted. This further investigation included simulating fuselage and tail effects without the pylon and hub, moving the rotorcraft body vertically downward within the wind tunnel by 5 inches, volume-mesh wake refinement behind hub and pylon, suppressing turbulence on the tail, suppressing turbulence on the front half of the fuselage and running the segregated solver rather than the coupled solver.

Of the approaches mentioned above, the last two exhibited reduced drag from the baseline case. It was found that by suppressing turbulence on the front of the fuselage drag could be reduced by about 9.5% while the lift force did not change and the front portion of the body over which a favorable or mildly adverse pressure gradient would be observed was forced to be laminar (while this may be an over-approximation of the laminar-flow extent, it provides an upper bound on the impact of laminar flow and substantial laminar flow is expected at this scale). Meanwhile, using a segregated solver was found to lead to a 4% reduction in the drag, which is driven by drag reduction in the tail. The difficulties in achieving stronger match in absolute values of drag will be revisited in the future, however, it is expected that the predicted changes in drag using active and passive control will be well-captured with the CFD. It is suspected that laminar regions are a contributor to higher CFD drag, and that further grid refinement is needed in the tail region.

Before implementing new concepts to reduce drag, it is important to capture additional features of the demonstrator that have not yet been included in the CFD. These include the exhaust of the oil cooler from back of the pylon, the auxiliary propulsor on the back of the fuselage and rotating the hub. While the oil cooler altered the fluid structures downstream of the pylon, the integrated static pressure over the surface of the body did not change; therefore, adding the oil cooler had no significant impact on the drag. The auxiliary propulsor was modeled in the simulations using a momentum source. Adding the auxiliary propulsor increased drag by 6%, which is consistent with the 5-7% increase in drag observed in experiment, validating the momentum source modeling in Star-CCM+, which can be used to model other active-control strategies. Rotating the hub mimics the spinning hub of the demonstrator. Two rotational speeds were used: one that matches the full-scale model, and another RPM which matches the advance ratio (using hub radius as reference). It was found that the higher RPM did not change the drag, while the lower RPM decreased the drag by 3%.

To determine where opportunities for drag reduction exist, the baseline CFD simulation was assessed. Regions of separated flow can be identified and flow control options can be evaluated for those regions. Streamlines in the flow field and on the surface of the body are identified and it was found that large vortices shed off the hub contribute to the pressure drag, and also have an impact on the drag of the fuselage and tail. The tail also has pressure drag due to its own wake, as do corner separations between the horizontal and vertical stabilizers. To reduce drag, initial simulations were conducted on the sensitivity of the hub and pylon drag to changes of the pylon shape. Also, an initial assessment of flow control on the sail fairing, including the placement of vortex generators also showed opportunities to reduce drag on the hub.

Figure 11A:
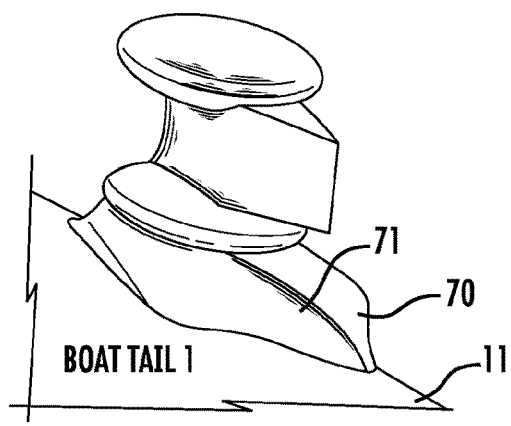
FIG. 11A is a perspective view of a pylon configuration in accordance with embodiments.
Figure 11B:
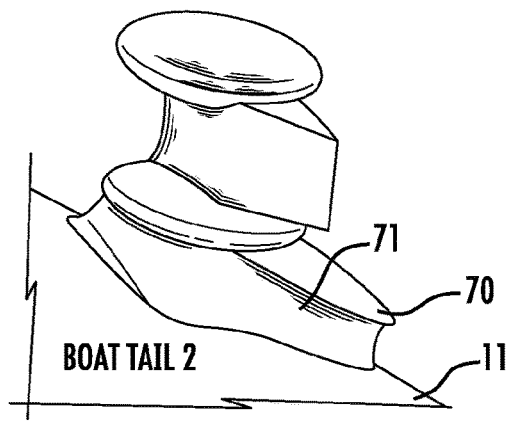
FIG. 11B is a perspective view of a pylon configuration in accordance with alternative embodiments.

In particular, the pylon was reshaped to have a more streamlined or "boat tail" design, as seen in FIGS. 11A and 11B. For the design of FIG. 11A, labeled as "Boat Tail 1", the pylon has been reshaped so that the cross-sectional area 70 decreases in the streamwise direction, while the top surface 71 curves downwards until it intersects with the top of the fuselage 11. For the design of FIG. 11B, "Boat Tail 2", the cross-sectional area 70 also decreases, but the top surface 71 of the pylon remains flat. Both boat tail designs reduce drag (by 4.3% and 8.4% for Boat Tail 1 and Boat Tail 2, respectively), although they also reduce the overall lift (by 20% and 40% respectively). However, if it is assumed that the rotor can compensate for the decrease in lift by generating more lift, and if the lift to drag ratio (L/D) for the rotor is assumed to be some fixed ratio, then the change in the drag can be computed for the entire body including the rotor with the same lift. With the rotor in mind, the drag reduction from Boat Tail 1 is 3.3% and for Boat Tail 2 is 6.5%.

Figure 12A:
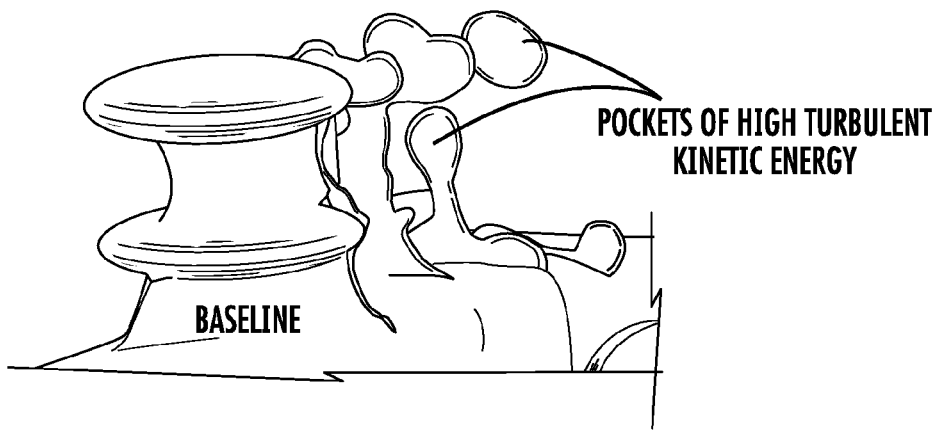
FIG. 12A illustrates a change in the turbulent kinetic energy downstream of a hub due to a pylon shape.
Figure 12B:
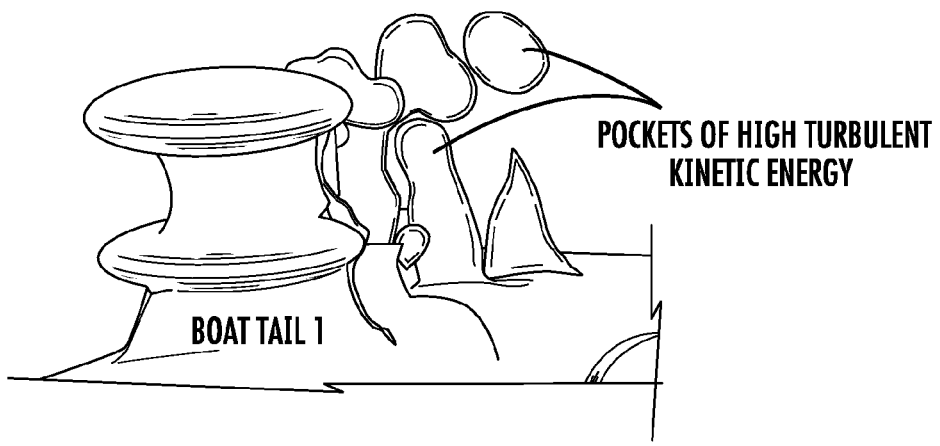
FIG. 12B illustrates a change in the turbulent kinetic energy downstream of a hub due to a pylon shape.
Figure 12C:
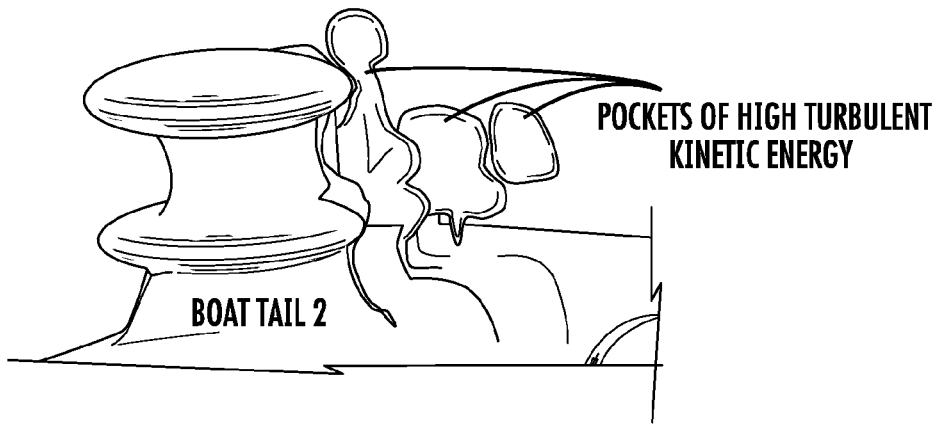
FIG. 12C illustrates a change in the turbulent kinetic energy downstream of a hub due to a pylon shape.
Figure 15A:
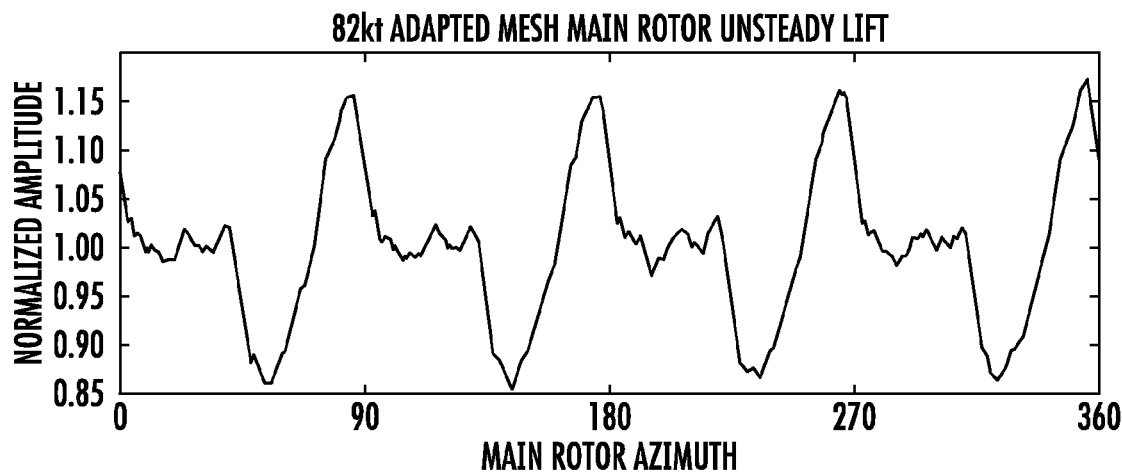
FIG. 15A is a graphical depiction of normalized amplitude vs. main rotor azimuth.
Figure 15B:
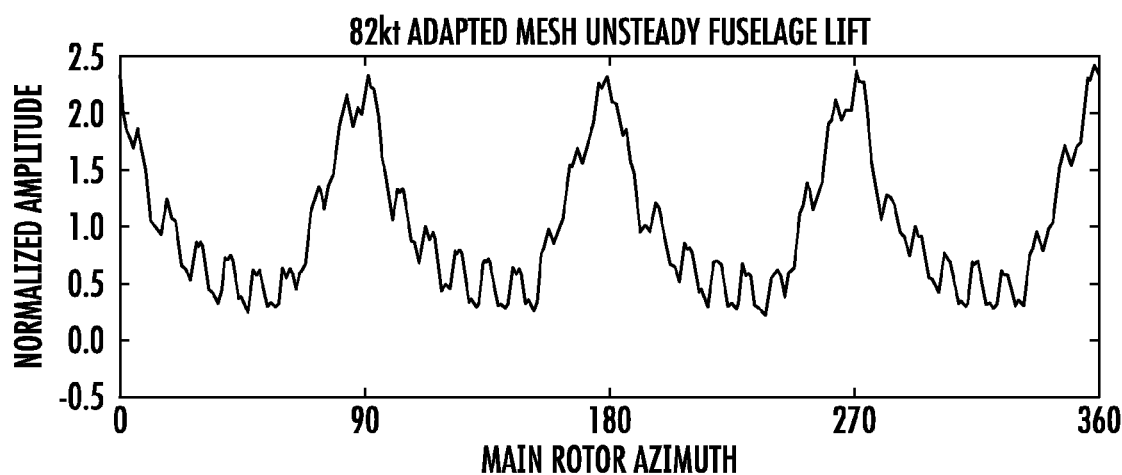
FIG. 15B is a graphical depiction of normalized amplitude vs. main rotor azimuth.
Figure 15C:
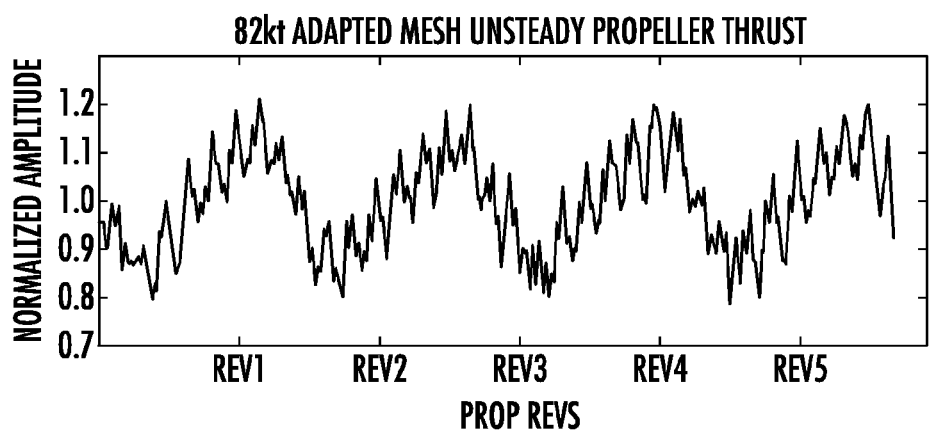
FIG. 15C is a graphical depiction of normalized amplitude vs. propeller revolutions.
Figure 15D:
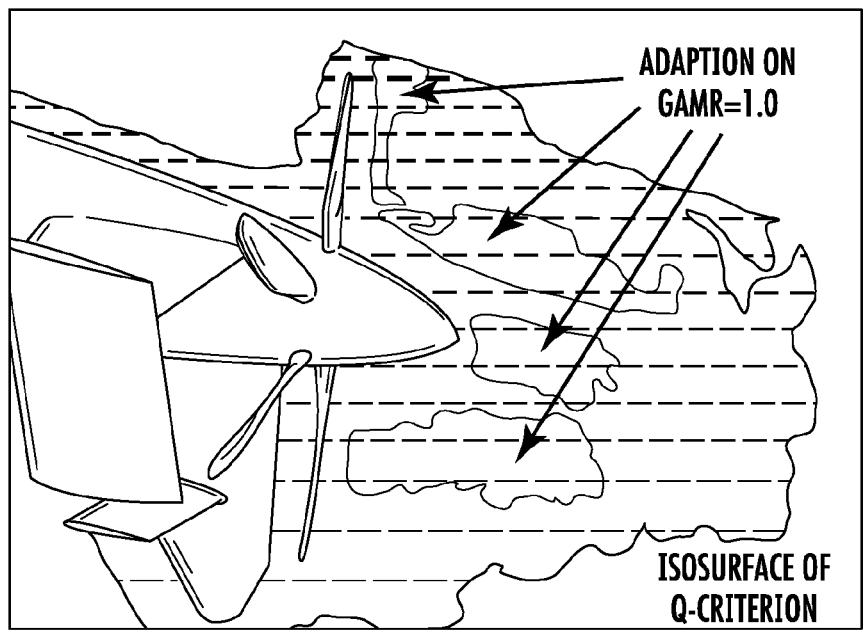
FIG. 15D is a perspective view of turbulence following an auxiliary propulsor of an aircraft.

The change in the turbulent kinetic energy downstream of the hub due to a change in the pylon shape is seen in FIGS. 12A-12C and in FIG. 15D. For Boat Tail 1, pockets of high turbulent kinetic energy near the fuselage were reduced as compared to a baseline example (see FIGS. 12A and 12B). For Boat Tail 2, the level of turbulent kinetic energy was reduced everywhere downstream of the hub as compared to the baseline example (see FIGS. 12A and 12C), the flow had been made more symmetric, and the wake from the hub remained higher above the fuselage surface.

To reduce the large separation off the hub, vortex generators were assessed (see FIG. 13), with the expectation that they could keep the flow attached and also reduce interactions between the top and bottom hub, which has a detrimental impact on drag. Vortex generators (VGs) help move separation further downstream due to the increased mixing they provide in the boundary layer. For certain simulations, VGs were placed on the sail fairing where the important parameters that describe the VGs are the vortex chord c, spacing w', thickness t, height h, angle Ψ, the distance S from the sail fairing leading edge, and while not shown here, the spacing between VG pairs. An optimization of these variables (not including their height and thickness) were conducted using OPTIMATE+®, an optimization toolbox within STAR-CCM+®. The hub with fairing and pylon were simulated alone as a first step to determine the potential benefits of VGs, and doing so reduced the computational size of the domain for a faster turnaround on simulations as part of the optimization study.

Figure 13:
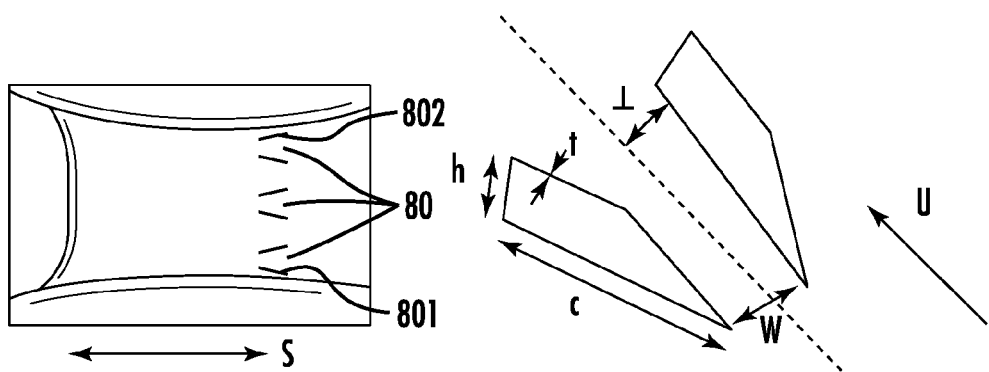
FIG. 13 is a schematic depiction of vortex generators in accordance with embodiments.

As shown in FIG. 13, VGs 80 on the sail fairing 81 may be arranged in pairs with the lower VG 801 of a pair angled downward and the upper VG 802 angled upward and the leading ends of each separated from one another. In accordance with embodiments, three pairs of VGs were used and arranged in a substantially vertical line along each side of the sail fairing 81. In accordance with alternative embodiments, VGs may be disposed on the sail fairing in vertical orientations, on the hub/pylon with vertical and horizontal orientations. In accordance with still further embodiments, active flow controls at and around the hub/pylon and sail fairing may be provided as plasma actuated active flow controls. In these cases, the plasma actuators may be disposed on the sail fairing, the hub/pylon and/or the fuselage proximate to the auxiliary propulsor in various orientations.

Figure 14:
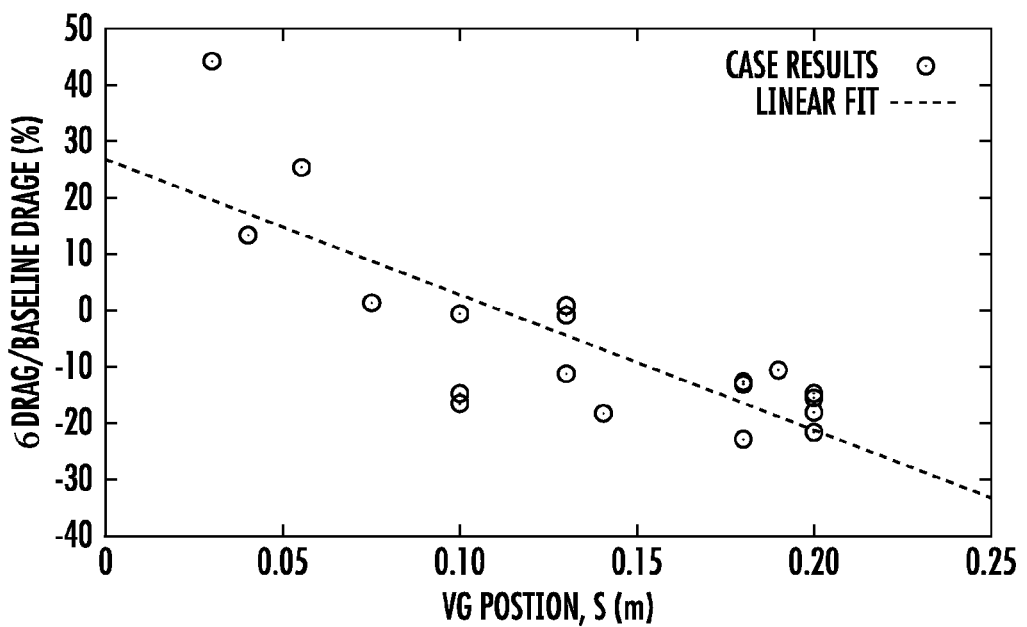
FIG. 14 is a graphical depiction of drag vs. vortex generator position.

With reference to FIG. 14, the optimization analysis realized a reduction in drag by 20% for the hub and pylon alone. The drag had strongest sensitivity to the VG location S from the fairing leading edge, as seen in FIG. 14, where the drag decreased linearly with VG position. The reduced drag comes from decoupling the top hub from the bottom hub. The flow has also become more symmetric. However, flow is directed downward more with the VGs, and therefore further simulations are being conducted with the fuselage included. Additionally, these studies were at model-scale, evaluation also needs to be performed at full-scale conditions, for which less separation is present on the sail fairing.

The studies described above were at low-speed 1/5-scale conditions (1/14 Re). There is uncertainty as to whether improvements would hold at the higher Reynolds and Mach numbers. Therefore, simulations are currently being conducted at full scale with similar flow control and other active control strategies are being assessed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotorcraft, comprising:
   a fuselage having a longitudinal axis, the fuselage including drag generating portions, a main rotor assembly having an upper rotor, a lower rotor and a pylon arranged between the upper and lower rotor, the pylon defining a pylon axis that is perpendicular to the longitudinal axis, and an auxiliary propulsor having an expected propulsion efficiency at least a portion of the auxiliary propulsor extending above a midpoint of the pylon axis;
   the auxiliary propulsor being disposed to ingest boundary layer flows at least a portion of which flows along the pylon axis and in wake regions associated with the drag generating portions establishing an increase in the expected propulsion efficiency of the rotorcraft by canceling a pressure drag increase associated with the auxiliary propulsor, wherein the drag generating portions include a main rotor pylon supporting the main rotor assembly, and aerodynamic features disposed on sides of the fuselage on the main rotor pylon, the drag generating features creating axisymmetric and near axisymmetric boundary layer flows and wake regions during forward flight of the rotorcraft.

2. The rotorcraft according to claim 1, wherein the main rotor assembly comprises coaxial, counter-rotating main rotors.

3. The rotorcraft according to claim 1, wherein the auxiliary propulsor is disposed aft of a rotor disk defined by the main rotor assembly.

4. The rotorcraft according to claim 1, wherein the auxiliary propulsor is disposed to intersect with a rotor of the main rotor assembly and respective rotations of the auxiliary propulsor and the rotor are timed to avoid mutual collisions.

5. The rotorcraft according to claim 1, further comprising:
   additional drag generating portions and additional auxiliary propulsory having respective expected propulsion efficiencies disposed on the fuselage;
   the additional auxiliary propulsors being disposed in additional wake regions associated with the additional drag generating portions and being provided with corresponding increases in the respective expected propulsion efficiencies thereof.

6. The rotorcraft according to claim 5, wherein the additional drag generating portions comprise at least one or more of landing gear elements, skids and removable payloads.

7. The rotorcraft according to claim 5, wherein the additional auxiliary propulsors comprise ducted rotors.

8. A method of designing a rotorcraft, comprising:
   assembling a fuselage having a longitudinal axis including drag generating portions, a main rotor assembly having an upper rotor, a lower rotor and a pylon arranged between the upper and lower rotor, the pylon defining a pylon axis that is perpendicular to the longitudinal axis, and an auxiliary propulsor, wherein the drag generating portions include a main rotor pylon supporting the main rotor assembly, and aerodynamic features disposed on sides of the fuselage on the main rotor pylon, the drag generating portions creating axisymmetric and near axisymmetric boundary layer flows and wake regions during forward flight of the rotorcraft;
   identifying the axisymmetric and near axisymmetric boundary layer flows and wake regions associated with the drag generating portions; and positioning the auxiliary propulsor such that at least a portion of the auxiliary propulsor extends above a midpoint of the pylon axis so as to ingest boundary layer flows in the wake regions to provide an increase in an expected propulsion efficiency by canceling a pressure drag increase associated with the auxiliary propulsor of the auxiliary propulsor.

9. The method according to claim 8, wherein the positioning comprises positioning the auxiliary propulsor aft of a rotor disk defined by the main rotor assembly.

10. The method according to claim 8, wherein the positioning comprises:
   positioning the auxiliary propulsor to intersect with a rotor of the main rotor assembly; and
   timing respective rotations of the auxiliary propulsor and the rotor to avoid mutual collisions.

11. The method according to claim 8, wherein the positioning comprises:
   identifying that an initial design position of the auxiliary propulsor will lead to an expected increase in an efficiency benefit cancelling pressure drag increase; and
   re-positioning the auxiliary propulsor increasingly aft of the initial design position until the expected increase in the efficiency benefit cancelling the pressure drag increase is reduced.

12. The method according to claim 8, further comprising:
   assembling additional drag generating portions and additional auxiliary propulsors onto the fuselage;
   identifying additional wake regions associated with the additional drag generating portions; and
   positioning the additional auxiliary propulsors in the additional wake regions to provide an increase in respective expected propulsion efficiencies of the additional auxiliary propulsors.

* * * * *